Patented Dec. 16, 1930

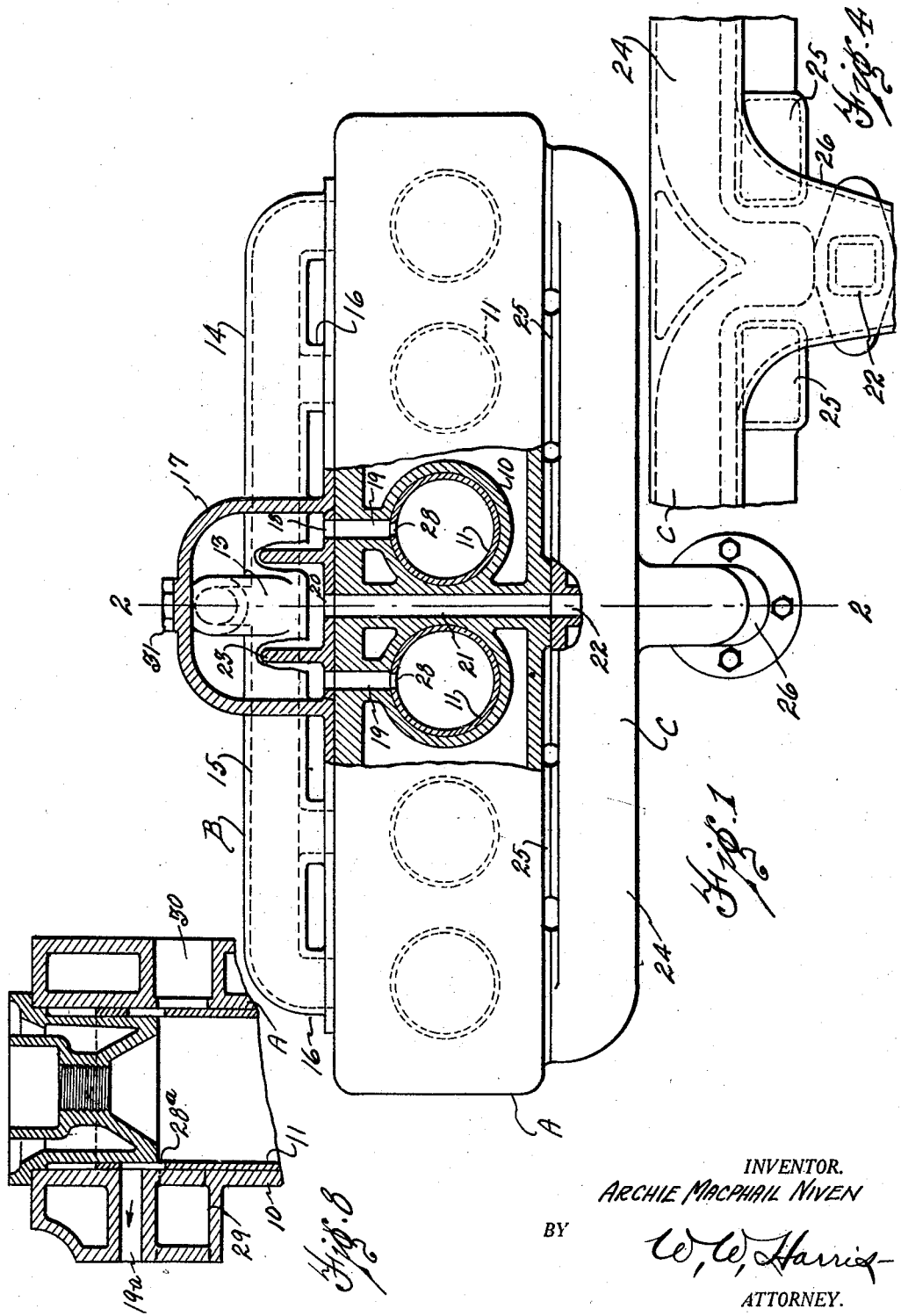

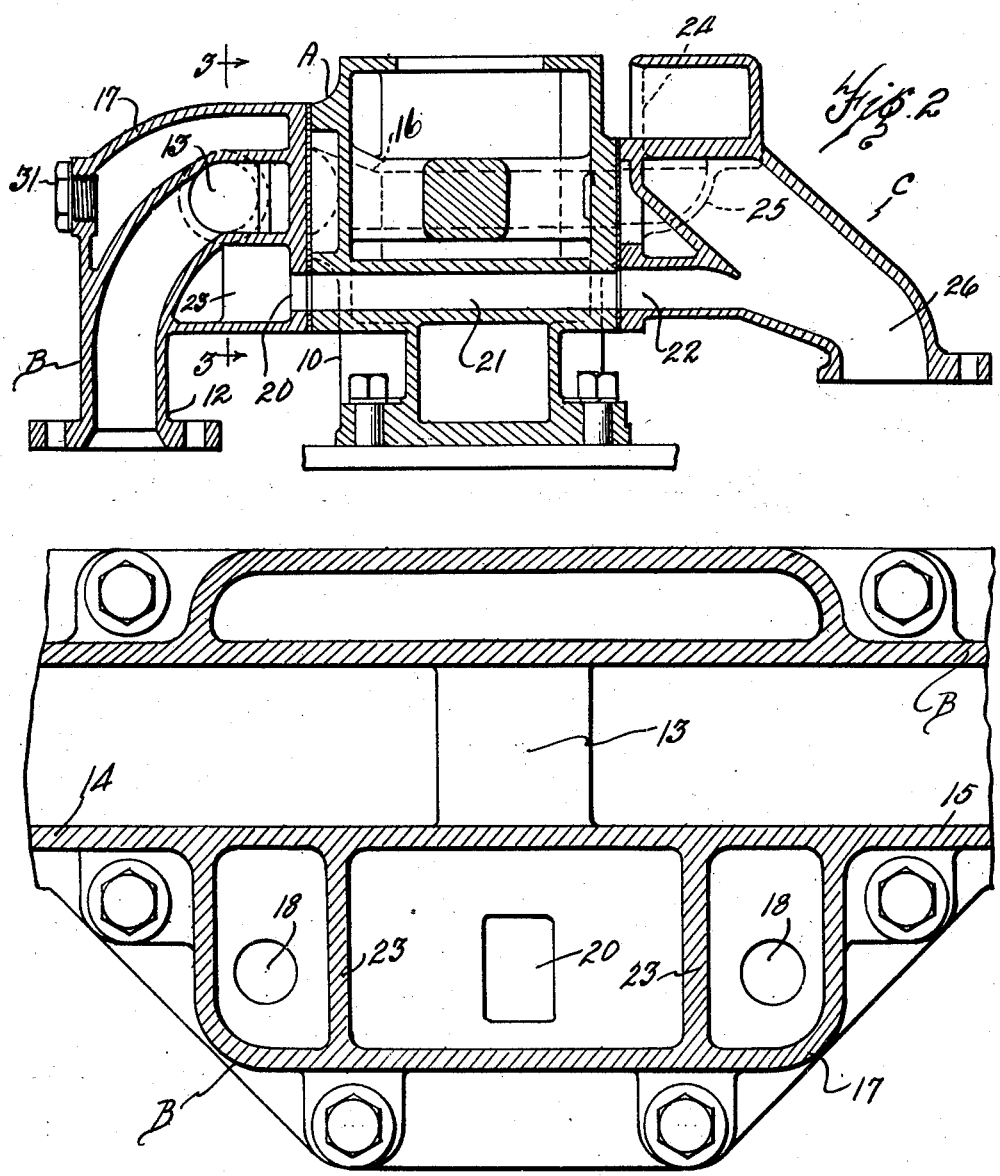

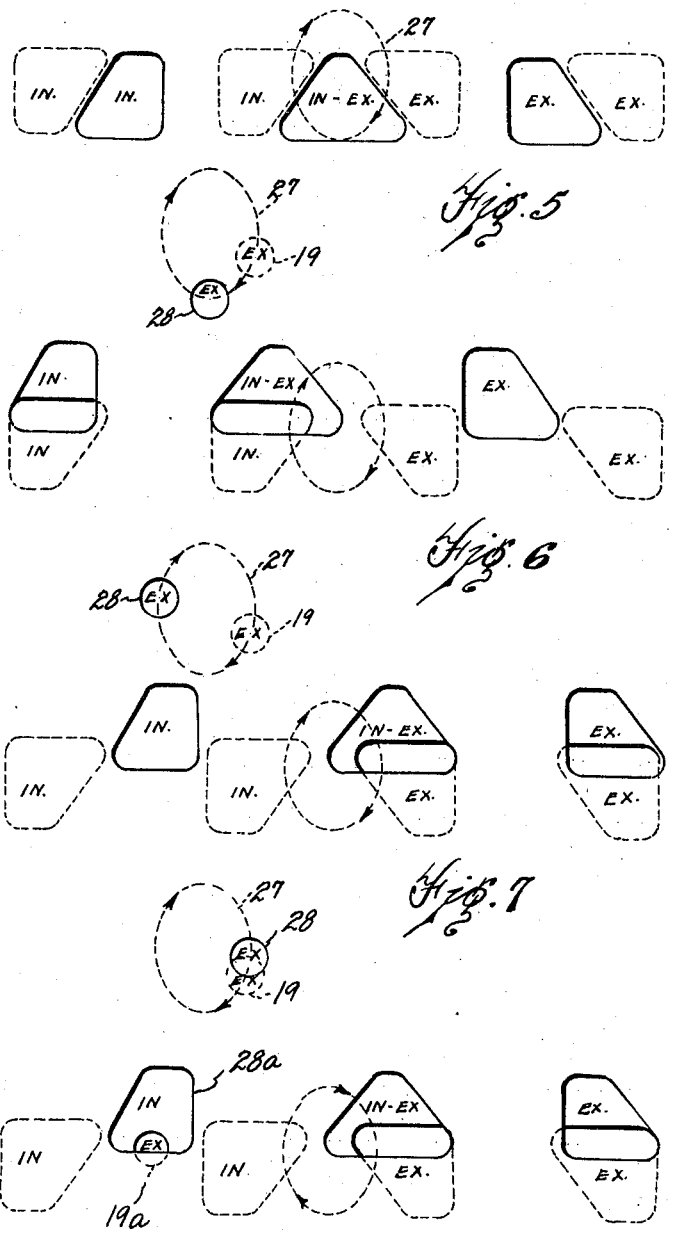

1,785,556

UNITED STATES PATENT OFFICE

ARCHIE MACPHAIL NIVEN, OF DETROIT, MICHIGAN, ASSIGNOR TO CONTINENTAL MOTORS CORPORATION, OF DETROIT, MICHIGAN, A CORPORATION OF VIRGINIA

INTERNAL-COMBUSTION ENGINE

Application filed March 7, 1927. Serial No. 173,320.

This invention relates to internal combustion engines and more particularly to the sleeve valve type of engine. In this general type of engine it is customary and desirable to provide the fuel intake at the side of the engine opposite to the exhaust outlet. Therefore difficulty has been experienced in providing efficient and at the same time compact and well appearing apparatus for heating the intake manifold or intake gases at one or more points by the exhaust gases. It has been customary to locate the exhaust manifold and intake manifold on opposite sides of the engine and then extend a pipe, ordinarily branched from the exhaust manifold, either around the engine block or else arched above the engine block whereby some of the exhaust gases are conducted to the intake manifold to form one or more so-called hot spots for heating the intake gases to form the desired mixture. Such prior devices are quite inefficient since the exhaust gases do not pass directly to the intake manifold; furthermore the provision of the branched exhaust pipe around or above the cylinder block destroys to a considerable degree the otherwise attractive and pleasing appearance of this type of engine besides adding to the complexity of the engine.

My invention has among its objects the provision of means for overcoming the aforesaid objectionable characteristics of sleeve valve engines. I have provided a construction whereby a portion of the exhaust gases may be conducted directly to heat the intake manifold, affording a simple apparatus, of high efficiency, and at the same time preserving the neat appearance of the engine.

With these and other objects in view my invention provides a novel combination and arrangement of parts as more particularly hereinafter described and claimed.

Referring to the drawings in which similar reference characters indicate corresponding parts throughout the several views, Fig. 1 is a plan view of my engine partly in section illustrating one manner of conducting the exhaust gases to the intake manifold exterior, Fig. 2 is a sectional elevation view along 2—2 of Fig. 1, Fig. 3 is a sectional view along 3—3 of Fig. 2, Fig. 4 is a side elevation view of the portion of the exhaust manifold shown in section in Fig. 2, Figs. 5, 6 and 7 represent, diagrammatically, developments of the sleeve and cylinder successively showing the relation of the ports controlling admission and exhaust and the means for admitting exhaust gases to the intake manifold, Fig. 8 is a sectional elevation view through a cylinder illustrating a modified form of my invention, and Fig. 9 is a sleeve and cylinder development showing the ports for the modification shown in Fig. 8.

In the drawings reference character A represents the engine block having one or more cylinders 10, the intake charge passing from intake manifold B to the cylinders and from the cylinders to the exhaust manifold C being controlled by one or more valves 11 controlling suitable ports. In the drawings I have illustrated my invention in connection with an engine of the single sleeve valve type, in which the sleeve is ordinarily driven at half engine speed by a suitable mechanism usually including a valve lay shaft (not shown) to impart to the sleeve a combined movement axially and circumferentially of the sleeve, i. e. a combined reciprocating and oscillating movement whereby a point on the sleeve will trace a closed figure on the cylinder. Such mechanisms for imparting such a motion to the sleeve are well known in the art.

The intake manifold B is formed with the usual carburetor connection 12, the gases being divided at 13 into branches 14 and 15 having outlet passages 16 leading to the various cylinders 10. Around the T-connection 13 I have located a casing or jacket 17 having one or more exhaust gas inlet openings 18 communicating with one or more conduits 19 leading to a convenient cylinder or cylinders. As shown, I prefer to form the conduit 19 in the form of a passage through the cylinder block A. The exhaust gases from openings 18 circulate around the T-connection 13, whence they pass through outlet 20 and the passage 21, also preferably extending through the cylinder block, to the inlet point 22 of the exhaust manifold C. Baffles 23 may be located between inlets 18 and outlet 20 or at other desired points to insure proper circulation of exhaust gases in the heating jacket 17.

The exhaust manifold C may be of any well known or other preferred type. I have illustrated this manifold as having the main longitudinal exhaust chamber 24 into which exhaust gases pass by conduits 25 from the various cylinders. At the point where the passage 22 connects into the exhaust pipe it may be desirable to form the parts so as to produce an injector or induction effect in the exhaust gases from the heating jacket. Thus, where the main exhaust gases are conducted away from the center of the manifold as shown in Fig. 2 and Fig. 4, the outlet 22 may terminate somewhat in the direction of the flow of exhaust gases in the outlet pipe 26 whereby an induction effect is set up assisting in circulating the exhaust gases from the heating jacket.

The flow of auxiliary exhaust gases from a working cylinder to the heating jacket may be controlled in several ways. Referring to Figs. 5, 6, and 7 I have shown one customary arrangement of inlet and exhaust ports, the sleeve ports being shown in full lines and the cylinder ports being shown in broken lines. The exhaust ports of the sleeve and cylinder are designated "Ex." while the intake ports are designated "In." The sleeve travel with respect to the cylinder is indicated at 27. In carrying out my invention I may form the sleeve with an opening 28 so located with respect to the inlet and exhaust ports and with respect to the passage 19, that during the intake period of the cycle as shown in Fig. 6 the opening 28 will be out of contact with the passage 19 as shown in Fig. 6, but during the exhaust period of the cycle as shown in Fig. 7, the opening 28 will register with passage 19. Thus simple and convenient means is provided for supplying any desired portion of the exhaust gases toward the intake manifold from the side of the cylinder substantially adjacent the intake manifold. It will further be noted that the opening 28 is so located as to provide ample seal with the ports during the entire cycle of movement.

Instead of providing an opening in the sleeve valve, such as the opening 28, I may utilize the usual sleeve intake port 28ª to exhaust a portion of the exhaust gases to the passage 19ª leading to the intake manifold heating means as shown in Figs. 8 and 9. In these views the usual cylinder intake and exhaust passages 29 and 30 respectively communicate with the intake and exhaust passages 16 and 25. With reference to Fig. 9 it will be noted that the cylinder is being exhausted in the usual manner except that the passageway 19ª is located so as to conduct a portion of the exhaust gases by way of one or more of the otherwise inactive intake sleeve valve ports 28ª. At such time during the cycle when intake, compression, or firing occurs the passageway 19ª is inactive, this opening being so located as to provide the necessary seal preventing leakage at such times.

My invention is not limited in its scope to any particular construction or arrangement of valves, since whether the valves are of the rotary, reciprocating, combined reciprocating and oscillating (as illustrated), single or multiple sleeves, is relatively unimportant as is the particular manner of driving the sleeves. Furthermore the details of the arrangement for applying the heat of the exhaust gases to the intake manifold may likewise vary, since it may be preferred to subject one or more portions of the pipe conducting the intake gases to more or less intimate or remote contact with the heating surface instead of jacketing the branch of the manifold as I have shown for purposes of illustration. A further modification within the scope of my invention might be made in the construction of the exhaust manifold and the point or points of introduction of the auxiliary exhaust gases into the main exhaust line of travel. If desired, instead of returning the exhaust gases, which are directed to form the hot spot, back to the exhaust manifold, the passageway 21 may be dispensed with and such auxiliary exhaust directed to other points of disposal, such as directly to the atmosphere by removal of the plug 31 as the quantity of auxiliary exhaust gases would ordinarily be comparatively small.

One important feature of my invention resides in providing means for passing exhaust gases directly to heat the intake gases in an engine of the sleeve type wherein the exhaust and intake cylinder ports are ordinarily arranged so as not to permit a convenient hot spot construction whereby I am enabled to obtain the benefits of an efficient fuel mixture commonly incorporated in the ordinary poppet valve, and other types of engines having the intake and exhaust manifold conveniently located on the same side of the cylinder block. Furthermore I avoid unattractive and inefficient transfer pipes for conducting the exhaust gases, after they leave the cylinder, to an intake manifold located remotely such as on the side of the cylinder block opposite the exhaust manifold.

What I claim as my invention is:

1. A sleeve valve engine having a ported cylinder and a ported sleeve controlling the intake and exhaust gases said cylinder having an auxiliary port, and means controlled by said ported sleeve for supplying exhaust gases through said auxiliary port to a point suitable for applying heat to the fuel mixture.

2. A sleeve valve engine having a cylinder provided with an intake port and an exhaust port and a sleeve having intake and exhaust ports adapted to cooperate with the cylinder ports for controlling admission of fuel and exhaust of gases to and from the engine respectively, and a cylinder port for conducting a portion of the exhaust gases from the engine to apply heat to the intake fuel, said sleeve valve also controlling the supply of exhaust gases to the last named port.

3. A sleeve valve engine having a cylinder provided with an intake port and an exhaust port and a sleeve having intake and exhaust ports adapted to cooperate with the cylinder ports for controlling admission of fuel and exhaust of gases to and from the engine respectively, and a cylinder port for conducting a portion of the exhaust gases from the engine to apply heat to the intake fuel, said sleeve valve also controlling the supply of exhaust gases to the last named port, the last named port extending in a general direction substantially opposite to the general direction of the said cylinder exhaust port.

4. A sleeve valve engine having a cylinder provided with an intake port and an exhaust port and a sleeve having intake and exhaust ports adapted to cooperate with the cylinder ports for controlling admission of fuel and exhaust of gases to and from the engine respectively, and a cylinder port for conducting a portion of the exhaust gases from the engine to apply heat to the intake fuel, said sleeve valve also controlling the supply of exhaust gases to the last named port, the last named port extending in a general direction substantially opposite to the general direction of the said cylinder exhaust port, and in a general direction substantially the same as the said cylinder intake port.

5. An internal combustion engine comprising in combination a cylinder, intake and exhaust manifolds respectively positioned substantially on opposite sides of the cylinder, said cylinder having intake and exhaust ports communicating respectively with said manifolds, other means independent of said exhaust port for conducting a portion of the exhaust gases directly from the cylinder to heat the intake gases, and sleeve valve means controlling the admission of the intake gases from the intake manifold to the cylinder and to the exhaust manifold from the cylinder and also controlling the admission of exhaust gases to the said conducting means.

6. An internal combustion engine comprising in combination a cylinder, intake and exhaust manifolds respectively positioned substantially on opposite sides of the cylinder, said cylinder having intake and exhaust ports communicating respectively with said manifolds, a heating jacket surrounding a portion of the intake manifold, other means independent of said exhaust port establishing communication between the cylinder and jacket, and sleeve valve mechanism controlling the admission of intake gases from the intake manifold to the cylinder and to the exhaust manifold from the cylinder and also controlling the admission of exhaust gases to the last said means.

7. A sleeve valve engine comprising a cylinder having intake and exhaust ports, sleeve valve means ported to control the cylinder ports and also ported additionally to permit passage of exhaust gases to heat the intake gases, and means for conducting the exhaust gases for intake heating purposes to a point suitable for the purpose stated.

8. In a sleeve valve engine, sleeve valve intake and exhaust ports, cylinder intake and exhaust ports, and means effective when the sleeve and cylinder exhaust ports are in registration for conducting a portion of the exhaust gases independently of the said cylinder exhaust port to a point suitable for applying heat to the intake gases.

9. In a sleeve valve engine, sleeve valve intake and exhaust ports, cylinder intake and exhaust ports, and means effective when the sleeve and cylinder exhaust ports are in registration for conducting a portion of the exhaust gases to a point suitable for applying heat to the intake gases, said last named means including a cylinder pasageway opening inwardly to the sleeve valve and controlled thereby.

10. A sleeve valve engine comprising a cylinder having intake and exhaust ports, sleeve valve means ported to control the cylinder ports and also ported additionally to permit passage of exhaust gases to heat the intake gases, means for conducting the exhaust gases for intake heating purposes to a point suitable for applying heat to the intake gases, and means for thereafter conducting the said exhaust gases, to mix with the exhaust gases passing from the cylinder exhaust port.

11. A sleeve valve engine comprising a cylinder having intake and exhaust ports, sleeve valve means ported to control the cylinder ports and also ported additionally to permit passage of exhaust gases to heat the intake gases, means for conducting the exhaust gases for intake heating purposes to a point suitable for applying heat to the intake gases, and means for thereafter conducting the said exhaust gases to mix with the exhaust gases passing from the cylinder exhaust port, the last named means including a cylinder passageway.

12. An engine comprising in combination a cylinder provided with intake and exhaust ports, a single sleeve valve concentric with the cylinder and having a combined reciprocating and oscillating movement with respect to the cylinder axis, said sleeve provided with intake and exhaust ports moving with the sleeve to control the cylinder intake and exhaust ports respectively, fuel conducting means for the cylinder intake ports, said sleeve valve and cylinder provided with auxiliary ports communicating during that portion of the sleeve valve cycle when the sleeve and cylinder exhaust ports are in registration, said auxiliary ports opened subsequent to the opening of said exhaust ports in the same cyclical event.

13. An engine comprising in combination a cylinder provided with intake and exhaust ports, a single sleeve valve concentric with the cylinder and having a combined reciprocating and oscillating movement with respect to the cylinder axis, said sleeve provided with intake and exhaust ports moving with the sleeve to control the cylinder intake and exhaust ports respectively, fuel conducting means for the cylinder intake ports, said sleeve valve and cylinder provided with auxiliary ports communicating during that portion of the sleeve valve cycle when the sleeve and cylinder exhaust ports are in registration, and means conducting exhaust gases from the auxiliary ports to heat the fuel conducting means.

14. An engine comprising in combination a cylinder provided with intake and exhaust ports, a single sleeve valve concentric with the cylinder and having a combined reciprocating and oscillating movement with respect to the cylinder axis, said sleeve provided with intake and exhaust ports moving with the sleeve to control the cylinder intake and exhaust ports respectively, fuel conducting means for the cylinder intake ports, said sleeve valve and cylinder provided with auxiliary ports communicating during that portion of the sleeve valve cycle when the sleeve and cylinder exhaust ports are in registration, and means conducting exhaust gases from the auxiliary ports to heat the fuel conducting means, the said cylinder ports lying substantially in a plane perpendicular to the axis of the cylinder and the said auxiliary cylinder port positioned beneath said plane.

15. An engine comprising in combination a cylinder provided with intake and exhaust ports, a single sleeve valve concentric with the cylinder and having a combined reciprocating and oscillating movement with respect to the cylinder axis, said sleeve provided with intake and exhaust ports moving with the sleeve to control the cylinder intake and exhaust ports respectively, fuel conducting means for the cylinder intake ports, and means independent of said cylinder ports and controlled by the sleeve valve for conducting exhaust gases from the engine combustion chamber to heat the fuel conducting means.

16. An engine operating on the four stroke cycle comprising in combination a ported cylinder, ported sleeve valve means controlling the engine intake and exhaust by cooperation with the cylinder ports, said cylinder having an auxiliary exhaust port, and means controlled by the sleeve valve means for conducting exhaust gases through said auxiliary cylinder port to apply heat to the fuel intake mixture.

17. An engine comprising in combination a cylinder provided with intake and exhaust ports, a single sleeve valve concentric with the cylinder and having a combined reciprocating and oscillating movement with respect to the cylinder axis, said sleeve provided with intake and exhaust ports moving with the sleeve to control the cylinder intake and exhaust ports respectively, fuel conducting means for the cylinder intake ports, said sleeve valve and cylinder provided with auxiliary ports communicating during that portion of the sleeve valve cycle when the sleeve and cylinder exhaust ports are in registration, means conducting exhaust gases from the auxiliary ports to heat the fuel conducting means, and means for thereafter conducting the exhaust gases to mix with the exhaust gases passing from the sleeve and cylinder exhaust ports.

18. An engine comprising in combination a cylinder and at least one movable sleeve valve cooperating therewith, said cylinder and sleeve valve having cooperating intake and exhaust ports all of which in one position of the sleeve valve movement are located substantially in a common plane perpendicular to the cylinder and sleeve axis, an auxiliary cylinder passage in addition to the aforesaid ports communicating with the engine combustion chamber for conducting a portion of the exhaust gases to heat the engine intake mixture, said sleeve valve controlling the supply of exhaust gases thereto.

19. An engine comprising in combination a cylinder block, a cylinder and at least one sleeve valve cooperating therewith, said cylinder block and sleeve valve having cooperating intake and exhaust passages for respectively conducting intake gases through the cylinder block to the combustion chamber and from the combustion chamber to a point outside the cylinder block, and means for conducting a portion of the exhaust gases at the time said sleeve and cylinder exhaust passages are in registration from a point of exhaust gas supply within the cylinder block to an outlet at a longitudinal side of the cylinder block, said conducting means being entirely within the cylinder block, and means outside the cylinder block communicating with said outlet for conducting the exhaust gases therefrom to apply heat to the intake gases.

20. An engine operating on the four-stroke cycle comprising in combination, a cylinder provided with intake and exhaust ports, sleeve valve means concentric with the cylinder and provided with intake and exhaust ports moving with the sleeve valve means to control the cylinder intake and exhaust ports respectively, fuel conducting means for the cylinder intake ports, and means independent of said cylinder ports and controlled by the sleeve valve means for conducting exhaust gases from the engine combustion chamber to heat the fuel conducting means.

21. An engine operating on the four stroke cycle comprising in combination, a cylinder provided with intake and exhaust ports, a single intake manifold communicating with the cylinder intake ports, an exhaust manifold communicating with the cylinder exhaust ports and arranged on the side of the engine opposite to the intake manifold, sleeve valve means ported for controlling said cylinder ports and ported additionally for supplying auxiliary exhaust gases to heat the intake manifold, and auxiliary exhaust gas conducting means intermediate the cylinder and intake manifold.

22. An engine comprising in combination, a cylinder provided with intake and exhaust ports, a single sleeve valve concentric with the cylinder and having a combined reciprocating and oscillating movement with respect to the cylinder axis, said sleeve and cylinder having a pair of cooperating intake ports and a pair of cooperating exhaust ports, cylinder passages respectively communicating with the cylinder intake and exhaust ports, said sleeve valve having an auxiliary port spaced below said cylinder ports, and an auxiliary cylinder passage registerable with said auxiliary sleeve port solely during registration of one of said pairs of sleeve and cylinder ports.

23. An internal combustion engine, comprising in combination a cylinder provided with gas intake means and with means for exhausting the gases, other means independent of said exhausting means for conducting a portion of the exhaust gases into proximity to said intake means to heat the intake gases, and means for controlling the admission of exhaust gases to said conducting means.

24. An internal combustion engine, comprising in combination a cylinder provided with gas intake means and with means for exhausting the gases including an exhaust port, other means independent of said exhausting means for conducting a portion of the exhaust gases into proximity to said intake means to heat the intake gases, and means for controlling the admission of exhaust gases to said conducting means to permit the admission of said exhaust gases thereto solely while said exhaust port is open.

In witness whereof, I hereunto subscribe my name this 31st day of January, A. D. 1927.

ARCHIE MACPHAIL NIVEN.